(12) United States Patent
Liu et al.

(10) Patent No.: US 9,924,445 B2
(45) Date of Patent: Mar. 20, 2018

(54) CAPABILITY OPENING SYSTEM, GATEWAY, AGENT, AND METHOD OF WIRELESS NETWORK

(71) Applicant: Huawei Technologies Co., Ltd., Shenzhen, Guangdong (CN)

(72) Inventors: Qingshun Liu, Shenzhen (CN); Zhimin Shen, Shenzhen (CN); Wentao Zhou, Shenzhen (CN); Wenyong Han, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 203 days.

(21) Appl. No.: 14/755,313

(22) Filed: Jun. 30, 2015

(65) Prior Publication Data

US 2015/0304939 A1   Oct. 22, 2015

Related U.S. Application Data

(63) Continuation of application No. PCT/CN2012/088129, filed on Dec. 31, 2012.

(51) Int. Cl.
*H04J 1/16*   (2006.01)
*H04W 48/06*   (2009.01)
(Continued)

(52) U.S. Cl.
CPC ............ *H04W 48/06* (2013.01); *H04W 8/22* (2013.01); *H04W 28/0236* (2013.01); *H04W 40/12* (2013.01); *H04W 48/02* (2013.01)

(58) Field of Classification Search
None
See application file for complete search history.

(56) References Cited

U.S. PATENT DOCUMENTS 8,724,509 B2 * 5/2014 Cheng ................. H04W 76/022
                                                    370/254
9,654,357 B2 * 5/2017 Fox ..................... H04L 41/5025
(Continued)

FOREIGN PATENT DOCUMENTS

CN   101127652 A   2/2008
CN   101442428 A   5/2009
(Continued)

OTHER PUBLICATIONS

Eiman Mohyeldin et al., "A Generic Framework for Context Aware and Adaptation Behaviour of Reconfigurable Systems", 2005 IEEE 16th International Symposium on Personal, Indoor and Mobile Radio Communications, Sep. 11, 2005, p. 1957-1963.

(Continued)

*Primary Examiner* — Phirin Sam

(57) ABSTRACT

The present invention provides a capability opening system, a capability opening gateway, a capability opening agent, and a capability opening method of a wireless network. The capability opening system includes the capability opening gateway, a UE, and an application server, where the UE includes an application client and the capability opening agent; and the application client exchanges information of a service with the application server through a first interface, the application server exchanges capability information of the wireless network with the capability opening gateway through a second interface, and the capability opening agent exchanges related radio environment information with the capability opening gateway through a third interface. In embodiments of the present invention, a capability opening agent is added to a UE.

13 Claims, 6 Drawing Sheets

(51) Int. Cl.
*H04W 8/22* (2009.01)
*H04W 48/02* (2009.01)
*H04W 28/02* (2009.01)
*H04W 40/12* (2009.01)

(56) References Cited

U.S. PATENT DOCUMENTS

| | | | | |
|---|---|---|---|---|
| 2004/0116117 A1* | 6/2004 | Ahvonen | ................ | H04L 29/06 455/432.3 |
| 2007/0130255 A1* | 6/2007 | Wolovitz | ................ | H04L 51/38 709/204 |
| 2009/0227231 A1* | 9/2009 | Hu | ........................ | H04L 12/14 455/410 |
| 2011/0032898 A1* | 2/2011 | Kazmi | .................. | H04W 28/06 370/329 |
| 2012/0039213 A1* | 2/2012 | Cheng | ................ | H04W 76/022 370/254 |
| 2012/0214444 A1* | 8/2012 | McBride | ............ | H04L 63/0807 455/411 |
| 2013/0019291 A1 | 1/2013 | Zou | | |
| 2013/0324082 A1* | 12/2013 | Mohajeri | .............. | H04W 12/06 455/411 |
| 2015/0142986 A1* | 5/2015 | Reznik | .................... | H04L 67/16 709/228 |
| 2016/0242097 A1* | 8/2016 | Dinan | .................... | H04L 45/50 |

FOREIGN PATENT DOCUMENTS

| | | |
|---|---|---|
| CN | 101945086 A | 1/2011 |
| CN | 102196012 A | 9/2011 |
| CN | 102573112 A | 7/2012 |

OTHER PUBLICATIONS

D. Stiliadis et al., "Software Defined Networks: Use Cases and Framework", Network Working Group, Oct. 22, 2011, 18 pages.

Li Erran Li et al., "Toward Software-Defined Cellular Networks", 2012 European Workshop on Software Defined Networking, Oct. 25, 2012, p. 7-12.

"Software-Defined Networking: The New Norm for Networks", Open Networking Foundation, Apr. 13, 2012, 12 pages.

* cited by examiner

CAPABILITY OPENING SYSTEM, GATEWAY, AGENT, AND METHOD OF WIRELESS NETWORK

CROSS-REFERENCE TO RELATED APPLICATIONS

This application is a continuation of International Application No. PCT/CN2012/088129, filed on Dec. 31, 2012, which is hereby incorporated by reference in its entirety.

TECHNICAL FIELD

The present invention relates to the field of wireless communications, and in particular, to a capability opening system, a capability opening gateway, a capability opening agent, and a capability opening method of a wireless network.

BACKGROUND

With the rapid development of an OTT (Over The Top) service, a mobile operator faces a dilemma in which a volume increases but a revenue does not increase, and needs to seek a new revenue source to maintain a stable growth of the revenue. Network capability opening is an attempt made by the operator to increase the revenue. Network capability is hoped to open to a third-party application, so as to enhance service experience of the third-party application and implement a new business model. The network capability opening is classified into a query type and a control type. An example of capabilities of the query type is to acquire a location of a user, a state of a cell, or an online state of a user; and an example of capabilities of the control type is to set required quality of service (Quality of Service, QoS) for a service.

An existing network capability opening architecture mainly consists of an application server, a capability opening gateway, a wireless core network, and a radio access network. An application programming interface (Application Programming Interface, API) can be provided for the application server through the capability opening gateway, so that the application server acquires capability information of a wireless network or controls the wireless network.

In the network capability opening architecture, specific functions of the components are as follows:

Capability opening gateway: Completes third-party authentication, acquires capability information of the wireless network, performs aggregation and arrangement provides a northbound capability opening API for a third party to invoke, and completes conversion between a southbound interface and a northbound interface.

Policy server: Performs policy control and policy authorization; refers to a policy and charging rules function (Policy and Charging Rule Function, PCRF) on a $3^{rd}$ generation partnership project ($3^{rd}$ Generation Partnership Project, 3GPP) network; and, in the capability opening architecture, connects to the capability opening gateway through a standard Diameter Rx interface to implement QoS capability opening.

Wireless core network: Specifically refers to a mobility management entity (Mobility Management Entity, MME), a serving gateway (Serving Gateway, S-GW), and a packet data network gateway (Packet data network GateWay, P-GW) on a long term evolution (Long Term Evolution, LTE) network; refers to a serving GPRS support node (Support GPRS Serving Node, SGSN), and a gateway GPRS support node (Gateway GPRS Support Node, GGSN) on a universal mobile telecommunications system (Universal Mobile Telecommunication System, UMTS) network; and, in the capability opening architecture, enhances the GGSN/P-GW, and reports a cell location and a cell state of a user equipment (User Equipment, UE) to the capability opening gateway.

Radio access network: Refers to an evolved NodeB (evolved Node B, eNodeB) on an LTE network; refers to a radio network controller (Radio Network Controller, RNC) and a NodeB on a UMTS network; and, in the capability opening architecture, enhances the eNodeB or the RNC, and reports a cell location and a cell state of a UE to the wireless core network through a user plane.

However, in the existing capability opening architecture, a capability opening gateway does not have information of a radio environment in which a UE resides, such as current signal quality and a current wireless access technology of the UE. When the capability opening gateway requires the radio environment information of the UE, firstly the radio environment information is acquired through a radio access network, then the radio environment information is transmitted to a wireless core network, and finally the wireless core network transmits the radio environment information to the capability opening gateway. This requires that the radio access network and the wireless core network be upgraded or reconstructed, and interconnection and interworking between different device vendors may also be involved, making deployment quite difficult.

SUMMARY

Embodiments of the present invention provide a capability opening system, a capability opening gateway, a capability opening agent, and a capability opening method of a wireless network, which avoid reconstruction of a radio access network and a wireless core network and simplifies network deployment.

In a first aspect, a capability opening system of a wireless network is provided and includes: a capability opening gateway, a UE, and an application server, where the UE includes an application client and a capability opening agent; and the application client exchanges service information with the application server through a first interface, the application server exchanges capability information of the wireless network with the capability opening gateway through a second interface, and the capability opening agent exchanges related radio environment information with the capability opening gateway through a third interface.

With reference to the first aspect, in a first implementation manner of the first aspect, the capability opening agent is configured to acquire radio environment information of the UE, and send the radio environment information to the capability opening gateway through the third interface.

With reference to the first aspect and the foregoing implementation manner, in another implementation manner of the first aspect, the capability opening gateway is configured to acquire the radio environment information through the third interface, and send the radio environment information to the application server; or acquire the radio environment information through the third interface, and perform admission control for capability opening of the wireless network according to the radio environment information.

With reference to the first aspect and the foregoing implementation manners, in another implementation manner of the first aspect, the capability opening gateway is specifically configured to generate an admission policy for the capability opening of the wireless network, and perform the admission control according to the admission policy and the radio environment information.

With reference to the first aspect and the foregoing implementation manners, in another implementation manner of the first aspect, the capability opening gateway is specifically configured to send an event list to the capability opening agent through the third interface, where the event list is used to acquire the radio environment information; receive a triggered event in the event list, where the triggered event is sent by the capability opening agent through the third interface; and determine the radio environment information according to the triggered event.

With reference to the first aspect and the foregoing implementation manners, in another implementation manner of the first aspect, the application client sends a service request to the application server; the application server sends first information to the capability opening gateway according to the service request, where the first information is used to request the capability opening of the wireless network, and the first information includes required QoS of the service; and the capability opening gateway performs the admission control according to the QoS and the radio environment information.

With reference to the first aspect and the foregoing implementation manners, in another implementation manner of the first aspect, the capability opening gateway sends an admission policy for the capability opening of the wireless network to the capability opening agent through the third interface; and the capability opening agent receives the admission policy, and performs the admission control for the capability opening of the wireless network according to the admission policy.

With reference to the first aspect and the foregoing implementation manners, in another implementation manner of the first aspect, the application client sends a service request to the application server through the first interface; the application client sends second information to the capability opening agent, where the second information is used to request the capability opening of the wireless network, and the second information includes the required QoS of the service; the capability opening agent acquires the radio environment information of the UE, and performs the admission control according to the radio environment information and the QoS; and the capability opening agent sends third information to the capability opening gateway through the third interface, where the third information is used to request the capability opening of the wireless network, and the third information includes the QoS.

In a second aspect, a capability opening method of a wireless network is provided and includes: acquiring radio environment information of a UE; and sending the radio environment information to an application server, or performing admission control for capability opening of the wireless network according to the radio environment information.

With reference to the second aspect, in an implementation manner of the second aspect, the acquiring radio environment information of a UE includes: sending an event list to a capability opening agent, where the event list is used to acquire the radio environment information, and the capability opening agent is on the UE; receiving a triggered event in the event list, where the triggered event is sent by the capability opening agent through a third interface, and the capability opening agent exchanges the radio environment information with a capability opening gateway through the third interface; and determining the radio environment information according to the triggered event.

With reference to the second aspect and the foregoing implementation manner, in another implementation manner of the second aspect, before the performing admission control for capability opening of the wireless network according to the radio environment information, the method further includes: generating an admission policy for the capability opening of the wireless network; and, the performing admission control for the wireless network according to the radio environment information includes: performing the admission control according to the admission policy and the radio environment information.

With reference to the second aspect and the foregoing implementation manners, in another implementation manner of the second aspect, before the performing admission control for capability opening of the wireless network according to the radio environment information, the method further includes: receiving fourth information sent by the application server, where the fourth information is used to request the capability opening of the wireless network, and the fourth information includes required QoS of a service requested by the UE from the application server; and, the performing admission control for the wireless network according to the radio environment information includes: performing the admission control according to the QoS and the radio environment information.

In a third aspect, a capability opening method of a wireless network is provided and includes: acquiring radio environment information of a UE; and performing admission control for capability opening of the wireless network according to the radio environment information.

With reference to the third aspect, in an implementation manner of the third aspect, before the performing admission control for capability opening of the wireless network according to the radio environment information, the method further includes: receiving an admission policy for the capability opening of the wireless network, where the admission policy is sent by a capability opening gateway through a third interface, and the capability opening gateway exchanges the admission policy with a capability opening agent of the UE through the third interface; and, the performing admission control for the wireless network according to the radio environment information includes: performing the admission control according to the radio environment information and the admission policy.

With reference to the third aspect and the foregoing implementation manner, in another implementation manner of the third aspect, before the performing admission control for the wireless network according to the radio environment information, the method further includes: receiving fifth information sent by an application client of the UE, where the fifth information is used to request the capability opening of the wireless network, and the fifth information includes required QoS of a service requested by the application client from an application server; and, the performing admission control for the wireless network according to the radio environment information includes: performing the admission control according to the QoS and the radio environment information.

In a fourth aspect, a capability opening gateway is provided and includes: an acquiring unit, configured to acquire radio environment information of a UE; and a processing unit, configured to send the radio environment information to an application server, or perform admission control for capability opening of a wireless network according to the radio environment information.

With reference to the fourth aspect, in an implementation manner of the fourth aspect, the acquiring unit is specifically configured to send an event list to a capability opening agent, where the event list is used to acquire the radio environment information, and the capability opening agent is on the UE; receive a triggered event in the event list, where the triggered event is sent by the capability opening agent through a third interface, and the capability opening agent exchanges the radio environment information with the capability opening gateway through the third interface; and determine the radio environment information according to the triggered event.

With reference to the fourth aspect and the foregoing implementation manner, in another implementation manner of the fourth aspect, the capability opening gateway further includes: a generating unit, configured to generate an admission policy for the capability opening of the wireless network; and the processing unit is specifically configured to perform the admission control according to the admission policy and the radio environment information.

With reference to the fourth aspect and the foregoing implementation manners, in another implementation manner of the fourth aspect, the capability opening gateway further includes: a receiving unit, configured to receive fourth information sent by the application server, where the fourth information is used to request the capability opening of the wireless network, and the fourth information includes required QoS of a service requested by the UE from the application server; and the processing unit is specifically configured to perform the admission control according to the QoS and the radio environment information.

In a fifth aspect, a capability opening agent is provided and includes: an acquiring unit, configured to acquire radio environment information of a UE; and a processing unit, configured to perform admission control for capability opening of a wireless network according to the radio environment information.

With reference to the fifth aspect, in an implementation manner of the fifth aspect, the capability opening agent further includes: a receiving unit, configured to receive an admission policy for the capability opening of the wireless network, where the admission policy is sent by a capability opening gateway through a third interface, and the capability opening gateway exchanges the admission policy with the capability opening agent of the UE through the third interface; and the processing unit is specifically configured to perform the admission control according to the radio environment information and the admission policy.

With reference to the fifth aspect and the foregoing implementation manner, in another implementation manner of the fifth aspect, the capability opening agent further includes: a receiving unit, configured to receive fifth information sent by an application client of the UE, where the fifth information is used to request the capability opening of the wireless network, and the fifth information includes required QoS of a service requested by the application client from an application server; and the processing unit is specifically configured to perform the admission control according to the QoS and the radio environment information.

BRIEF DESCRIPTION OF THE DRAWINGS

To describe the technical solutions in the embodiments of the present invention more clearly, the following briefly introduces accompanying drawings required for describing the embodiments of the present invention. Apparently, the accompanying drawings in the following description show merely some embodiments of the present invention, and a person of ordinary skill in the art may still derive other drawings according to these accompanying drawings without creative efforts.

DETAILED DESCRIPTION

The following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by a person of ordinary skill in the art based on the embodiments of the present invention without creative efforts shall fall within the protection scope of the present invention.

Figure 1:
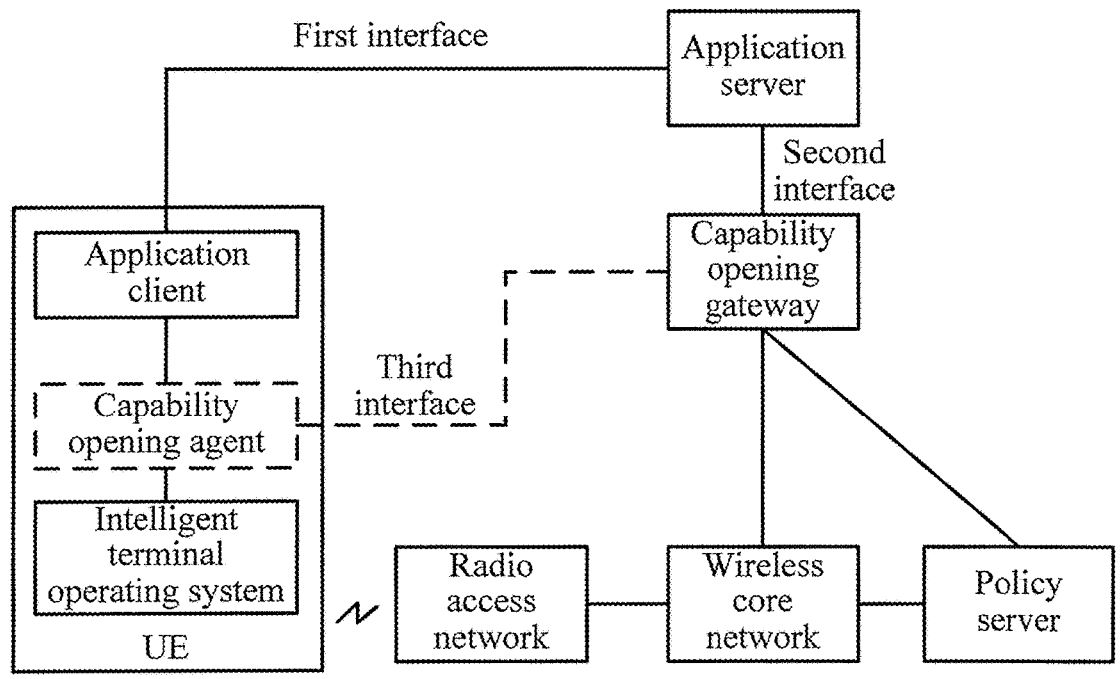
FIG. 1 is a diagram of a scenario according to an embodiment of the present invention.

FIG. 1 is a diagram of a scenario according to an embodiment of the present invention. In FIG. 1, a capability opening agent and a third interface are added on a basis of an existing capability opening system, where the third interface is between the capability opening agent and a capability opening gateway. The capability opening agent is capable of sending radio environment information of a UE to the capability opening gateway through the third interface. The radio environment information may include current signal quality of the UE, a current wireless access technology of the UE, cell location information of the UE, or the like. After acquiring the radio environment information of the UE, the capability opening gateway may provide the radio environment information for an application server to use; or may perform admission control for capability opening of a wireless network according to the radio environment information of the UE. For example, an application client of the UE sends a service request to the application server; after receiving the service request, the application server provides the capability opening gateway with a service description and required QoS of the service, and requests capability opening; and the capability opening gateway determines, according to the radio environment information of the UE sent by the capability opening agent on the UE, whether a wireless network supports the QoS of the UE, and denies the capability opening request from the application server if the UE is located at a cell edge or if signal quality is lower than a certain threshold.

Figure 2:
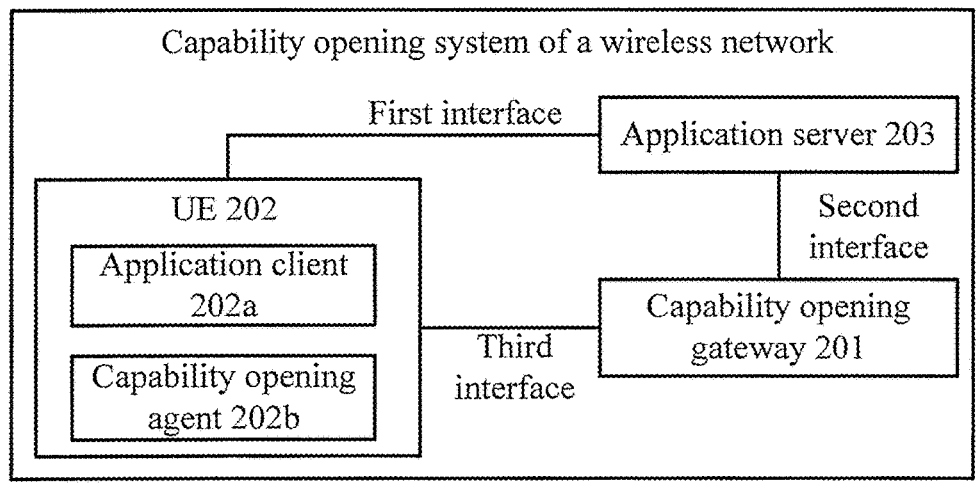
FIG. 2 is a block diagram of a capability opening system of a wireless network according to an embodiment of the present invention.

FIG. 2 is a block diagram of a capability opening system of a wireless network according to an embodiment of the present invention.

The capability opening system of the wireless network shown in FIG. 2 includes: a capability opening gateway 201, a UE 202, and an application server 203, where the UE 202 includes an application client 202a and a capability opening agent 202b.

In FIG. 2, the application client 202a exchanges service information with the application server 203 through a first interface, the application server 203 exchanges capability information of the wireless network with the capability opening gateway 201 through a second interface, and the capability opening agent 202b exchanges related radio environment information with the capability opening gateway 201 through a third interface.

In the embodiment of the present invention, a capability opening agent is added to a UE, so that the capability opening agent is capable of directly exchanging related radio environment information with a capability opening gateway, thereby avoiding reconstruction of a radio access network and a wireless core network, and simplifying network deployment.

It should be noted that the related radio environment information may be radio environment information of the UE, such as current wireless signal quality of the UE, a current wireless access technology of the UE, and a cell location of the UE; or may also be an admission policy for capability opening of the wireless network such as a permitted wireless access technology or a wireless signal quality threshold, where the admission policy is generated by the capability opening gateway 201, and a radio environment in which the UE resides can be inferred by determining whether the UE meets the admission policy.

It should be noted that a purpose of the related radio environment information is not limited in the embodiment of the present invention.

Optionally, in an embodiment, the related radio environment information may be used to externally open radio environment information, such as a location and an access technology of the UE. For example, the capability opening agent 202b is configured to acquire the radio environment information of the UE, and send the radio environment information to the capability opening gateway through the third interface; and after receiving the radio environment information of the UE sent by the capability opening agent, the capability opening gateway 201 may send the radio environment information to the application server 203.

Optionally, in another embodiment, the related radio environment information may further be used to perform, for the UE, admission control for the capability opening of the wireless network. For example, the capability opening agent 202b is configured to acquire the radio environment information of the UE, and send the radio environment information to the capability opening gateway through the third interface; and when receiving the radio environment information of the UE sent by the capability opening agent, the capability opening gateway 201 may perform the admission control for the capability opening of the wireless network according to the radio environment information according to the radio environment information.

It should be noted that a manner of performing the admission control is not limited in the embodiment of the present invention.

Optionally, in another embodiment, the admission control may be performed by the capability opening agent 202b.

For example, the capability opening gateway 201 may send an admission policy for the capability opening of the wireless network to the capability opening agent 202b through the third interface; and the capability opening agent 202b receives the admission policy, and performs the admission control for the capability opening of the wireless network according to the admission policy.

For another example, the application client 202a sends a service request to the application server 203 through the first interface; the application client 202a sends second information to the capability opening agent 202b, where the second information is used to request the capability opening of the wireless network, and the second information includes required QoS of the service; the capability opening agent 203 acquires the radio environment information of the UE, and performs admission control according to the radio environment information and the QoS; and the capability opening agent 203 sends third information to the capability opening gateway 201 through the third interface, where the third information is used to request the capability opening of the wireless network, and the third information includes the QoS.

Optionally, in another embodiment, the admission control policy may also be executed by the capability opening gateway 201.

For example, the capability opening gateway 201 receives, through the third interface, the radio environment information sent by the capability opening agent 202b, and performs admission control for the capability opening of the wireless network according to the radio environment information.

For another example, the capability opening gateway 201 first generates an admission policy for the capability opening of the wireless network; and when receiving, through the third interface, the radio environment information sent by the capability opening agent 202b, performs admission control for the capability opening of the wireless network according to the radio environment information and the admission policy.

For another example, the application client 202a sends a service request to the application server 203; the application server 203 sends second information to the capability opening gateway 201 according to the service request, where the second information includes the required QoS of the service; and the capability opening gateway 201 performs admission control according to the QoS and the radio environment information.

It should be noted that a manner of acquiring the radio environment information of the UE is not limited in the embodiment of the present invention. For example, when the capability opening gateway 201 requires the radio environment information, indication information may be sent to the capability opening agent 202b through the third interface; and after receiving the indication information, the capability opening agent 202b sends the radio environment information of the UE to the capability opening gateway 201.

Optionally, in another embodiment, the capability opening gateway 201 may be specifically configured to send an event list to the capability opening agent 202*b* through the third interface, where the event list is used to acquire the radio environment information; receive a triggered event in the event list, where the triggered event is sent by the capability opening agent 202*b* through the third interface; and determine the radio environment information according to the triggered event. The event list may include an event, for example, indicating that the wireless access technology has changed, the wireless signal quality is higher than a preset threshold, or the cell location has changed.

It should further be noted that a specific form of the admission policy is not limited in the embodiment of the present invention. For example, the admission policy may include a permitted wireless access technology, a wireless signal quality threshold, or the like.

The foregoing has described in detail a capability opening system of a wireless network according to an embodiment of the present invention with reference to FIG. 2. The following describes in detail a capability opening method of a wireless network according to an embodiment of the present invention with reference to FIG. 3 and FIG. 4.

Figure 3:
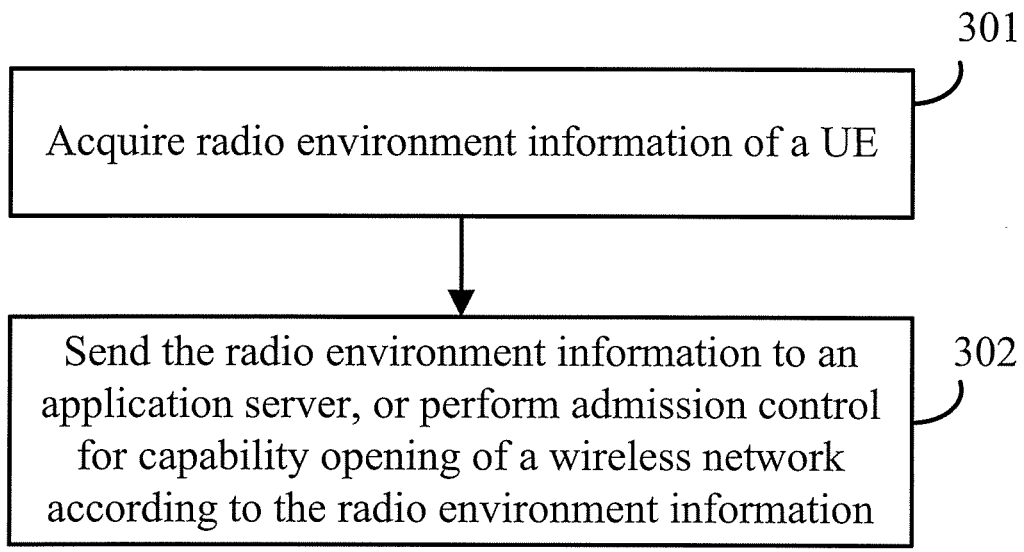
FIG. 3 is a flowchart of a capability opening method of a wireless network according to an embodiment of the present invention.

FIG. 3 is a flowchart of a capability opening method of a wireless network according to an embodiment of the present invention. The method in FIG. 3 may be executed by the capability opening gateway 201 in FIG. 2.

It should be understood that the capability opening gateway in FIG. 2 is capable of implementing each step that is executed by a capability opening gateway in FIG. 3, and for a purpose of avoiding repetition, no further details are provided.

301. Acquire radio environment information of a UE.

302. Send the radio environment information to an application server, or perform admission control for capability opening of the wireless network according to the radio environment information.

In the embodiment of the present invention, a capability opening agent is added to a UE, so that the capability opening agent is capable of directly exchanging related radio environment information with a capability opening gateway, thereby avoiding reconstruction of a radio access network and a wireless core network, and simplifying network deployment.

Optionally, in an embodiment, the acquiring radio environment information of a UE may include: sending an event list to the capability opening agent, where the event list is used to acquire the radio environment information, and the capability opening agent is on the UE; receiving a triggered event in the event list, where the triggered event is sent by the capability opening agent through a third interface, and the capability opening agent exchanges the radio environment information with the capability opening gateway through the third interface; and determining the radio environment information according to the triggered event.

Optionally, in another embodiment, before the performing admission control for the wireless network according to the radio environment information, the method may further include: generating an admission policy for wireless network opening; and the performing admission control for the wireless network according to the radio environment information includes: performing the admission control according to the admission policy and the radio environment information.

Optionally, in another embodiment, before the performing admission control for the wireless network according to the radio environment information, the method may further include: receiving fourth information sent by the application server, where the fourth information includes required QoS of a service requested by the UE from the application server; and the performing admission control for the wireless network according to the radio environment information includes: performing the admission control according to the QoS and the radio environment information.

Optionally, in an embodiment, before the performing admission control for the wireless network according to the radio environment information, the method may further include: receiving an admission policy for the wireless network, where the admission policy is sent by the capability opening gateway through the third interface, and the capability opening gateway exchanges the admission policy with the capability opening agent of the UE through the third interface; and the performing admission control for the wireless network according to the radio environment information includes: performing the admission control according to the radio environment information and the admission policy.

Optionally, in another embodiment, before the performing admission control for the wireless network according to the radio environment information, the method may further include: receiving fifth information sent by an application client of the UE, where the third information includes required QoS of a service requested by the application client from the application server; and the performing admission control for the wireless network according to the radio environment information includes: performing the admission control according to the QoS and the radio environment information.

Figure 4:
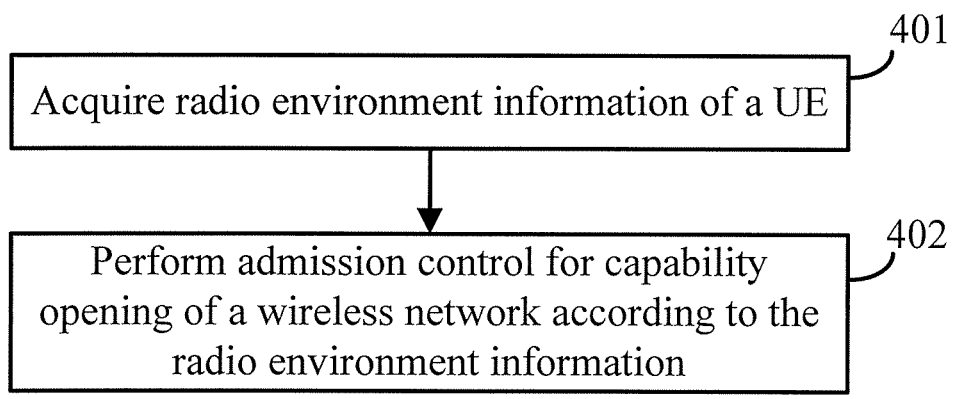
FIG. 4 is a flowchart of a capability opening method of a wireless network according to an embodiment of the present invention.

FIG. 4 is a flowchart of a capability opening method of a wireless network according to an embodiment of the present invention. The method in FIG. 4 may be executed by the capability opening agent 202*b* in FIG. 2.

It should be understood that the capability opening agent in FIG. 2 is capable of implementing each step that is executed by a capability opening agent in FIG. 4, and for a purpose of avoiding repetition, no further details are provided.

401. Acquire radio environment information of a UE.

402. Perform admission control for capability opening of the wireless network according to the radio environment information.

In the embodiment of the present invention, a capability opening agent is added to a UE, so that the capability opening agent is capable of directly exchanging related radio environment information with a capability opening gateway, thereby avoiding reconstruction of a radio access network and a wireless core network, and simplifying network deployment.

Optionally, in an embodiment, before the performing admission control for capability opening of the wireless network according to the radio environment information, the method may further include: receiving an admission policy for the capability opening of the wireless network, where the admission policy is sent by the capability opening gateway through a third interface, and the capability opening gateway exchanges the admission policy with the capability opening agent of the UE through the third interface; and the performing admission control for the wireless network according to the radio environment information includes: performing the admission control according to the radio environment information and the admission policy.

Optionally, in another embodiment, before the performing admission control for the wireless network according to the radio environment information, the method may further include: receiving fifth information sent by an application client of the UE, where the fifth information is used to request the capability opening of the wireless network, and the fifth information includes required QoS of a service requested by the application client from an application server; and the performing admission control for the wireless network according to the radio environment information includes: performing the admission control according to the QoS and the radio environment information.

The following describes the embodiments of the present invention in more detail with reference to specific examples. It should be noted that examples in FIG. 5 to FIG. 8 are merely intended to help a person skilled in the art to understand the embodiments of the present invention, but not intended to confine the embodiments of the present invention to specific numerical values or specific scenarios shown in the examples. Obviously, a person skilled in the art may make various equivalent modifications or changes according to the examples given in FIG. 5 to FIG. 8, and such modifications or changes also fall within the scope of the embodiments of the present invention.

Figure 5:
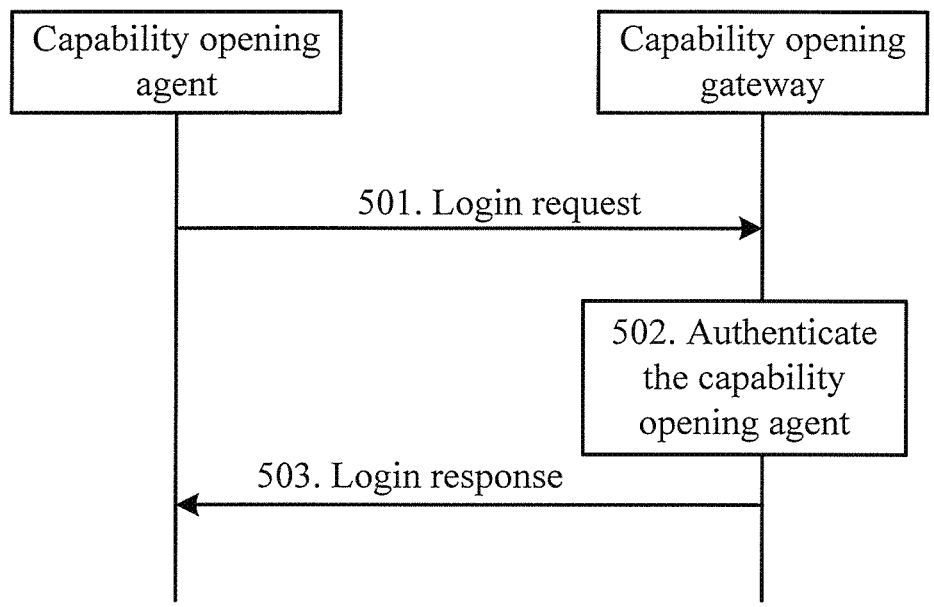
FIG. 5 is a flowchart of a login process of a capability opening agent according to an embodiment of the present invention.

FIG. 5 is a flowchart of a login process of a capability opening agent according to an embodiment of the present invention.

501. The capability opening agent sends a login request to a capability opening gateway.

It should be noted that the login request may be sent during power-on of a UE, or may be periodically sent. The capability opening agent located on the UE logs in to the capability opening gateway, and acquires information, such as an event list and an admission control policy for capability opening. The login request may carry information, such as a user name, a password, and an IP address of a terminal.

502. The capability opening gateway authenticates an identity of the capability opening agent.

503. The capability opening gateway sends a login response to the capability opening agent.

The capability opening gateway returns a login response message to the capability opening agent, where the login response message carries the admission control policy for the capability opening (such as a permitted wireless access technology or a wireless signal quality threshold), the event list (such as an event about a change of a cell location, an event about a change of a wireless access technology, an event about wireless signal quality higher than a threshold, or an event about wireless signal quality lower than a threshold), and a duration of a periodical login timer. The capability opening agent stores the admission control policy for the capability exposure and the subscribed event list, and starts the periodical login timer.

In the embodiment of the present invention, a capability opening agent is added to a UE, so that the capability opening agent is capable of directly exchanging related radio environment information with a capability opening gateway, thereby avoiding reconstruction of a radio access network and a wireless core network, and simplifying network deployment.

Figure 6:
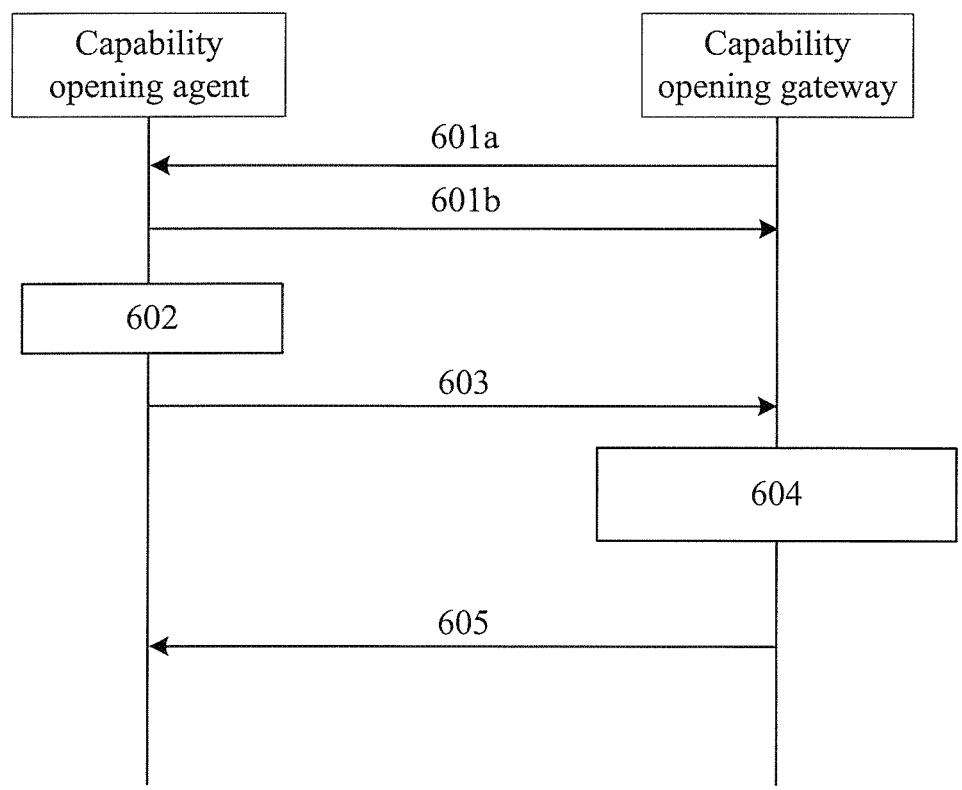
FIG. 6 is a flowchart of a method for reporting an event according to an embodiment of the present invention.

FIG. 6 is a flowchart of a method for reporting an event according to an embodiment of the present invention. The method in FIG. 5 may be used to acquire radio environment information of a UE.

601*a*. A capability opening gateway sends an event list to a capability opening agent, where the event list is required for acquiring radio environment information of a UE.

601*b*. The capability opening agent sends a receiving response message to the capability opening gateway.

602. The capability opening agent detects that an event, such as an event about a change of a wireless access technology, an event about wireless signal quality higher than a threshold, or an event about a change of a cell location, is triggered.

603. The capability opening agent sends an event report request message carrying the event and a parameter related to the event to the capability opening gateway, such as an event about a change of a wireless access technology and a current wireless access technology, an event about signal quality higher than a threshold, an event about a change of a cell location, and an identifier of a current cell.

604. The capability opening gateway stores the event and the information related to the event.

605. The capability opening gateway returns an event report response message to the capability opening agent.

In the embodiment of the present invention, a capability opening agent is added to a UE, so that the capability opening agent is capable of directly exchanging related radio environment information with a capability opening gateway, thereby avoiding reconstruction of a radio access network and a wireless core network, and simplifying network deployment.

Figure 7:
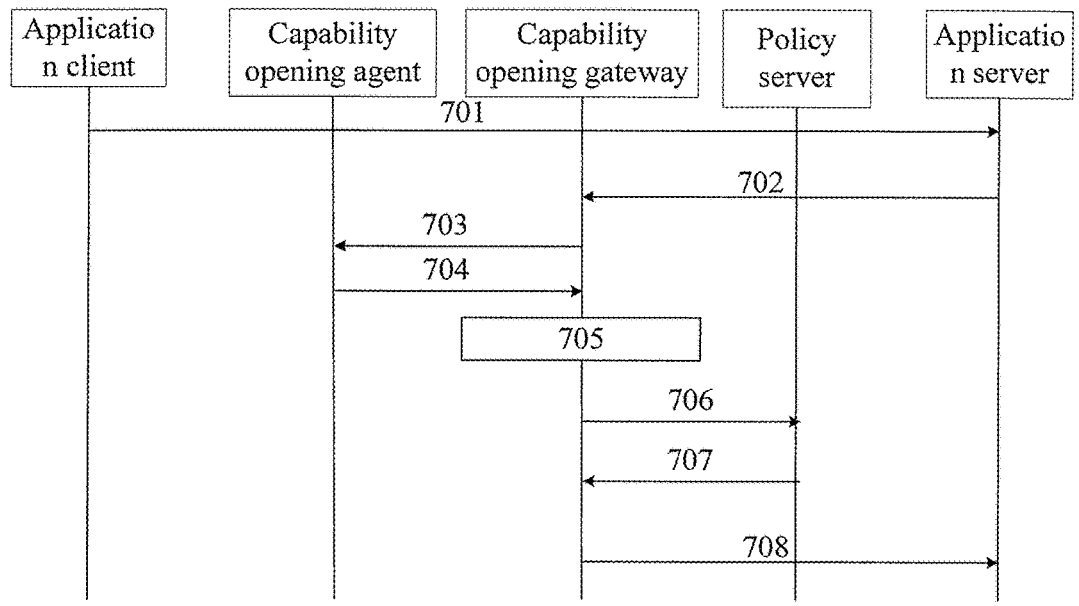
FIG. 7 is a flowchart of an admission control method for capability opening of a wireless network according to an embodiment of the present invention.

FIG. 7 is a flowchart of an admission control method for capability opening of a wireless network according to an embodiment of the present invention. The admission control method in the embodiment in FIG. 7 is executed by a capability opening gateway.

701. An application client requests a required service from an application server.

702. The application server sends a QoS resource application request message to the capability opening gateway, to apply for the required QoS, where the QoS resource application request message provides service description information and the required QoS.

703. The capability opening gateway sends a notification message to a capability opening agent, to instruct the capability opening agent to send radio environment information of a UE, where the UE is a UE on which the application client resides.

704. The capability opening agent sends the radio environment information of the UE to the capability opening gateway.

It should be noted that a manner of acquiring the radio environment information of the UE is not limited in the embodiment of the present invention. For example, a manner of reporting an event in FIG. 5 may also be used to obtain the radio environment information of the UE.

It should further be noted that step 703 and step 704 may be omitted when the radio environment information of the UE is obtained in the manner in FIG. 5.

705. The capability opening gateway performs admission control according to wireless signal quality and a wireless access technology; and continues with processing in step 706 if the wireless signal quality is higher than a specified threshold and the current wireless access technology can meet a QoS requirement, or otherwise denies the QoS resource request.

706. The capability opening gateway requests the required QoS from a policy server through a standard Diameter AAR.

707. The policy server instructs a wireless core network to execute a QoS policy, and returns a Diameter AAA response message to the capability opening gateway.

708. The capability opening gateway returns a QoS resource application response message to the application server.

In the embodiment of the present invention, a capability opening agent is added to a UE, so that the capability opening agent is capable of directly exchanging related radio environment information with a capability opening gateway, thereby avoiding reconstruction of a radio access network and a wireless core network, and simplifying network deployment.

Figure 8:
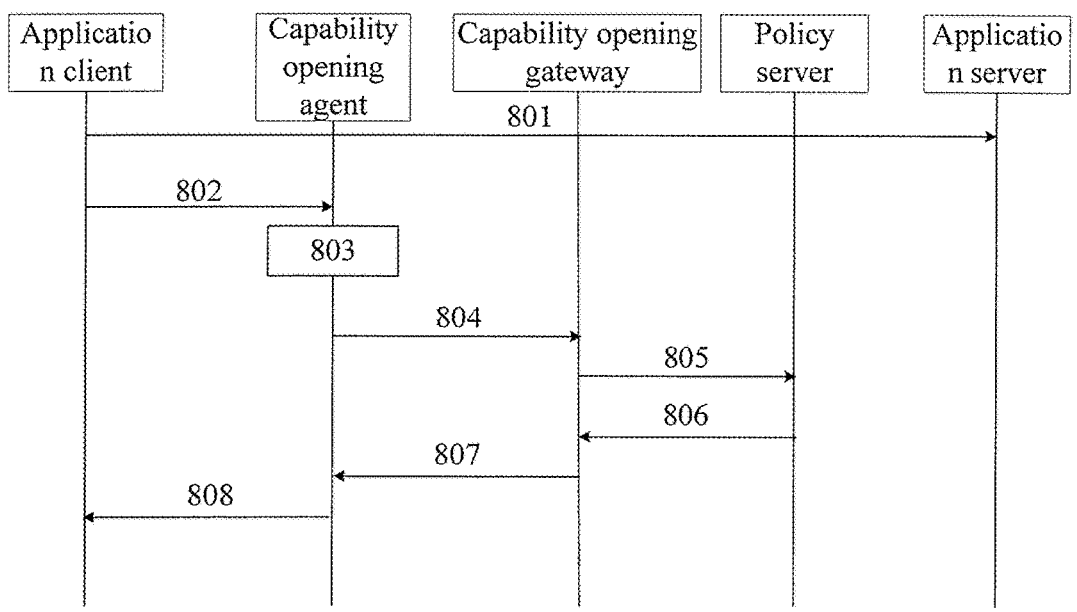
FIG. 8 is a flowchart of an admission control method for capability opening of a wireless network according to an embodiment of the present invention.

FIG. 8 is a flowchart of an admission control method for capability opening of a wireless network according to an embodiment of the present invention. In the embodiment of the present invention, a capability opening agent provides a capability opening API for an application client to invoke; and the capability opening agent performs admission control, and then requests a required capability from a capability opening gateway.

801. The application client requests a required service from an application server.

802. The application client invokes a QoS API of the capability opening agent, and sends a QoS resource application request message to the capability opening agent, to apply for required QoS, where the QoS resource application request message provides service description information and the required QoS.

803. The capability opening agent performs admission control according to an admission policy provided by the capability opening gateway; and accepts the QoS resource application request if a current wireless access technology belongs to a wireless access technology provided by the capability opening gateway and wireless signal quality is higher than a specified threshold, or otherwise denies the QoS resource application request.

It should be noted that the admission policy may be acquired by using the method in the embodiment shown in FIG. 4, and acquired from the capability opening gateway during login of a UE; or when the request in 802 is received, the capability opening agent requests the admission policy from the capability opening gateway, which is not limited in the present invention.

804. The capability opening agent sends the QoS resource application request message carrying the service description information and the required QoS, to the capability opening gateway.

805. The capability opening gateway requests the required QoS from a policy server through a standard Diameter AAR message.

806. The policy server instructs a wireless core network to execute a QoS policy, and returns a Diameter AAA response message to the capability opening gateway.

807. The capability opening gateway returns a QoS resource application response message to the capability opening agent.

808. The capability opening agent returns the QoS resource application response to the application client.

In the embodiment of the present invention, a capability opening agent is added to a UE, so that the capability opening agent is capable of directly exchanging related radio environment information with a capability opening gateway, thereby avoiding reconstruction of a radio access network and a wireless core network, and simplifying network deployment.

The foregoing has described in detail a capability opening method of a wireless network according to an embodiment of the present invention with reference to FIG. 3 and FIG. 4. The following describes in detail a capability opening gateway and a capability opening agent according to embodiments of the present invention with reference to FIG. 9 to FIG. 12.

Figure 9:
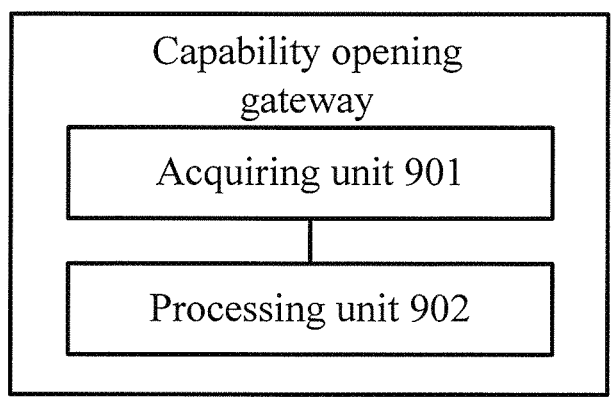
FIG. 9 is a block diagram of a capability opening gateway according to an embodiment of the present invention.

FIG. 9 is a block diagram of a capability opening gateway according to an embodiment of the present invention. The capability opening gateway in FIG. 9 includes an acquiring unit 901 and a processing unit 902.

It should be understood that the capability opening gateway in FIG. 9 is capable of implementing each step that is executed by the capability opening gateway in FIG. 3 to FIG. 8, and for a purpose of avoiding repetition, no further details are provided.

The acquiring unit 901 is configured to acquire radio environment information of a UE.

The processing unit 902 is configured to send the radio environment information to an application server, or perform admission control for capability opening of a wireless network according to the radio environment information.

In the embodiment of the present invention, a capability opening agent is added to a UE, so that the capability opening agent is capable of directly exchanging related radio environment information with a capability opening gateway, thereby avoiding reconstruction of a radio access network and a wireless core network, and simplifying network deployment.

Optionally, in an embodiment, the acquiring unit 901 is specifically configured to send an event list to the capability opening agent, where the event list is used to acquire the radio environment information, and the capability opening agent is on the UE; receive a triggered event in the event list, where the triggered event is sent by the capability opening agent through a third interface, and the capability opening agent exchanges the radio environment information with the capability opening gateway through the third interface; and determine the radio environment information according to the triggered event.

Optionally, in another embodiment, the capability opening gateway further includes: a generating unit, configured to generate an admission policy for the capability opening of the wireless network; and the processing unit is specifically configured to perform the admission control according to the admission policy and the radio environment information.

Optionally, in another embodiment, the capability opening gateway further includes: a receiving unit, configured to receive fourth information sent by the application server, where the fourth information is used to request the capability opening of the wireless network, and the fourth information includes required QoS of a service requested by the UE from the application server; and the processing unit 902 is specifically configured to perform the admission control according to the QoS and the radio environment information.

Figure 10:
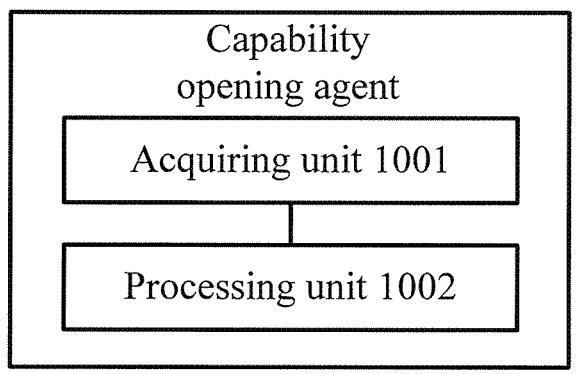
FIG. 10 is a block diagram of a capability opening agent according to an embodiment of the present invention.

FIG. 10 is a block diagram of a capability opening agent according to an embodiment of the present invention. The capability opening agent in FIG. 10 includes an acquiring unit 1001 and a processing unit 1002.

It should be understood that the capability opening agent in FIG. 10 is capable of implementing each step that is executed by the capability opening agent in FIG. 3 to FIG. 8, and for a purpose of avoiding repetition, no further details are provided.

The acquiring unit 1001 acquires radio environment information of a UE.

The processing unit 1002 performs admission control for capability opening of a wireless network according to the radio environment information.

In the embodiment of the present invention, a capability opening agent is added to a UE, so that the capability opening agent is capable of directly exchanging related radio environment information with a capability opening gateway, thereby avoiding reconstruction of a radio access network and a wireless core network, and simplifying network deployment.

Optionally, in an embodiment, the capability opening agent may further include: a receiving unit, configured to receive an admission policy for the capability opening of the wireless network, where the admission policy is sent by the capability opening gateway through a third interface, and the capability opening gateway exchanges the admission policy with the capability opening agent of the UE through the third interface; and the processing unit 1002 is specifically configured to perform the admission control according to the radio environment information and the admission policy.

Optionally, in another embodiment, the receiving unit is further configured to receive fifth information sent by an application client of the UE, where the fifth information is used to request the capability opening of the wireless network, and the fifth information includes required QoS of a service requested by the application client from an application server; and the processing unit 1002 is specifically configured to perform the admission control according to the QoS and the radio environment information.

Figure 11:
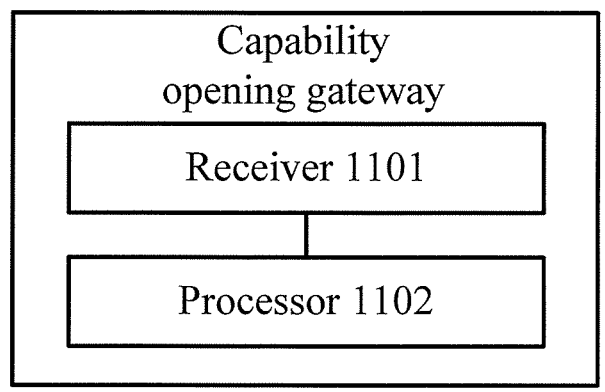
FIG. 11 is a block diagram of a capability opening gateway according to another embodiment of the present invention.

FIG. 11 is a block diagram of a capability opening gateway according to another embodiment of the present invention. The capability opening gateway in FIG. 11 includes a receiver 1101 and a processor 1102.

It should be understood that the capability opening gateway in FIG. 11 is capable of implementing each step that is executed by the capability opening gateway in FIG. 3 to FIG. 8, and for a purpose of avoiding repetition, no further details are provided.

The receiver 1101 is configured to acquire radio environment information of a UE.

The processor 1102 is configured to send the radio environment information to an application server, or perform admission control for capability opening of a wireless network according to the radio environment information.

In the embodiment of the present invention, a capability opening agent is added to a UE, so that the capability opening agent is capable of directly exchanging related radio environment information with a capability opening gateway, thereby avoiding reconstruction of a radio access network and a wireless core network, and simplifying network deployment.

Optionally, in an embodiment, the receiver 1101 is specifically configured to send an event list to the capability opening agent, where the event list is used to acquire the radio environment information, and the capability opening agent is on the UE; receive a triggered event in the event list, where the triggered event is sent by the capability opening agent through a third interface, and the capability opening agent exchanges the radio environment information with the capability opening gateway through the third interface; and determine the radio environment information according to the triggered event.

Optionally, in another embodiment, the capability opening gateway further includes: a generating unit, configured to generate an admission policy for the capability opening of the wireless network; and he processor is specifically configured to perform the admission control according to the admission policy and the radio environment information.

Optionally, in another embodiment, the capability opening gateway further includes: a receiving unit, configured to receive fourth information sent by the application server, where the fourth information is used to request the capability opening of the wireless network, and the fourth information includes required QoS of a service requested by the UE from the application server; and the processor 1102 is specifically configured to perform the admission control according to the QoS and the radio environment information.

Figure 12:
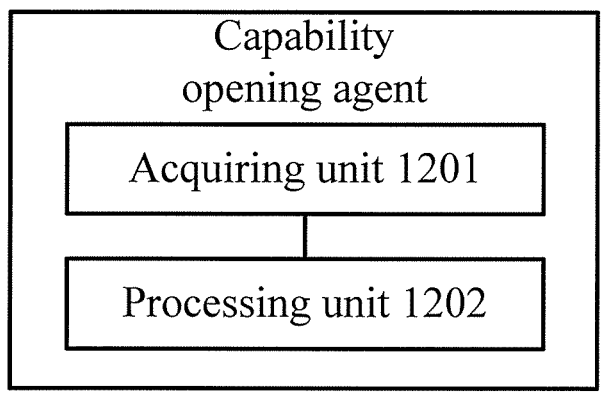
FIG. 12 is a block diagram of a capability opening agent according to another embodiment of the present invention.

FIG. 12 is a block diagram of a capability opening agent according to another embodiment of the present invention. The capability opening agent in FIG. 12 includes a receiver 1201 and a processor 1202.

It should be understood that the capability opening agent in FIG. 12 is capable of implementing each step that is executed by the capability opening agent in FIG. 3 to FIG. 8, and for a purpose of avoiding repetition, no further details are provided.

The receiver 1201 acquires radio environment information of a UE.

The processor 1202 performs admission control for capability opening of a wireless network according to the radio environment information.

In the embodiment of the present invention, a capability opening agent is added to a UE, so that the capability opening agent is capable of directly exchanging related radio environment information with a capability opening gateway, thereby avoiding reconstruction of a radio access network and a wireless core network, and simplifying network deployment.

Optionally, in an embodiment, the receiver 1201 is further configured to receive an admission policy for the capability opening of the wireless network, where the admission policy is sent by the capability opening gateway through a third interface, and the capability opening gateway exchanges the admission policy with the capability opening agent of the UE through the third interface; and the processor 1202 is specifically configured to perform the admission control according to the radio environment information and the admission policy.

Optionally, in another embodiment, the receiver 1201 is further configured to receive fifth information sent by an application client of the UE, where the fifth information is used to request the capability opening of the wireless network, and the fifth information includes required QoS of a service requested by the application client from an application server; and the processor 1202 is specifically configured to perform the admission control according to the QoS and the radio environment information.

A person of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solution. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiments are merely exemplary. For example, the division of the units is merely logical function division and may be other division in actual implementation. For example, a plurality of units or components may be combined or integrated into another system, or some features may be ignored or not performed.

In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and the parts displayed as units may or may not be physical units, may be located in one position, or may be distributed on a plurality of network units. A part of or all of the units may be selected according to actual needs to achieve the objectives of the solutions of the embodiments.

In addition, functional units in the embodiments of the present invention may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The computer software product is stored in a storage medium and includes several instructions for instructing a computer device (which may be a personal computer, a server, a network device, or the like) to perform all or a part of the steps of the methods described in the embodiments of the present invention. The foregoing storage medium includes: any mediums that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the claims.

What is claimed is:

1. A capability opening system of a wireless network, the system comprising:
    a capability opening gateway;
    a user equipment (UE); and
    an application server; wherein:
        the UE comprises an application client and a capability opening agent, wherein the application client exchanges service information with the application server through a first interface;
        the application server exchanges capability information of the wireless network with the capability opening gateway through a second interface;
        the capability opening agent exchanges related radio environment information with the capability opening gateway through a third interface; wherein the capability opening agent is configured to:
            acquire radio environment information of the UE, and
            send the radio environment information to the capability opening gateway through the third interface;
        wherein the capability opening gateway is further configured to:
            acquire the radio environment information through the third interface, and send the radio environment information to the application server, or
            acquire the radio environment information through the third interface, and perform admission control for capability opening of the wireless network according to the radio environment information,
            send an event list to the capability opening agent through the third interface, wherein the event list is used to acquire the radio environment information,
            receive a triggered event in the event list, wherein the triggered event is sent by the capability opening agent through the third interface, and
            determine the radio environment information according to the triggered event.

2. The system according to claim 1, wherein the capability opening gateway is further configured to:
    generate an admission policy for the capability opening of the wireless network; and
    perform the admission control according to the admission policy and the radio environment information.

3. The system according to claim 1, wherein:
    the application client is configured to send a service request to the application server;
    the application server is configured to send first information to the capability opening gateway according to the service request, wherein the first information is used to request the capability opening of the wireless network, and the first information comprises required QoS of the service; and
    the capability opening gateway is configured to perform the admission control according to the QoS and the radio environment information.

4. A capability opening system of a wireless network, the system comprising:
    a capability opening gateway;
    a user equipment (UE); and
    an application server; wherein:
        the UE comprises an application client and a capability opening agent, wherein the application client exchanges service information with the application server through a first interface;
        the application server exchanges capability information of the wireless network with the capability opening gateway through a second interface;
        the capability opening agent exchanges related radio environment information with the capability opening gateway through a third interface;
        the capability opening gateway is configured to send an admission policy for capability opening of the wireless network to the capability opening agent through the third interface;
        the capability opening agent is configured to receive the admission policy, and perform admission control for capability opening of the wireless network according to the admission policy;
        the application client is configured to:
            send a service request to the application server through the first interface, and
            send second information to the capability opening agent, wherein the second information is used to request the capability opening of the wireless network, and the second information comprises required QoS of the service; and the capability opening agent is configured to:
   acquire radio environment information of the UE, and perform the admission control according to the radio environment information and the QoS, and
   send third information to the capability opening gateway through the third interface, wherein the third information is used to request the capability opening of the wireless network, and the third information comprises the QoS.

5. A capability opening method of a wireless network, the method comprising:
   acquiring radio environment information of a user equipment (UE); and
   sending the radio environment information to an application server, or performing admission control for capability opening of the wireless network according to the radio environment information;
   wherein acquiring radio environment information of a UE comprises:
      sending an event list to a capability opening agent, wherein the event list is used to acquire the radio environment information, and the capability opening agent is on the UE,
      receiving a triggered event in the event list, wherein the triggered event is sent by the capability opening agent through a third interface, and the capability opening agent exchanges the radio environment information with a capability opening gateway through the third interface, and
      determining the radio environment information according to the triggered event.

6. The method according to claim 5, wherein:
   before performing admission control for the wireless network according to the radio environment information, the method further comprises:
      generating an admission policy for the capability opening of the wireless network; and
   performing admission control for the wireless network according to the radio environment information comprises:
      performing the admission control according to the admission policy and the radio environment information.

7. A capability opening method of a wireless network, the method comprising:
   acquiring radio environment information of a user equipment (UE); and
   sending the radio environment information to an application server, or performing admission control for capability opening of the wireless network according to the radio environment information; wherein:
   before performing admission control for capability opening of the wireless network according to the radio environment information, the method further comprises:
      receiving fourth information sent by the application server, wherein the fourth information is used to request the capability opening of the wireless network, and the fourth information comprises required QoS of a service requested by the UE from the application server; and
   performing admission control for the wireless network according to the radio environment information comprises:
      performing the admission control according to the QoS and the radio environment information.

8. A capability opening method of a wireless network, the method comprising:
   acquiring radio environment information of a user equipment (UE);
   receiving fifth information sent by an application client of the UE, wherein the fifth information is used to request a capability opening of the wireless network, and the fifth information comprises required QoS of a service requested by the application client from an application server; and
   performing admission control for the capability opening of the wireless network according to the radio environment information, wherein performing the admission control for the capability opening of the wireless network according to the radio environment information comprises:
      performing the admission control according to the QoS and the radio environment information.

9. The method according to claim 8, further comprising:
   receiving an admission policy for the capability opening of the wireless network, wherein the admission policy is sent by a capability opening gateway through a third interface, and the capability opening gateway exchanges the admission policy with a capability opening agent of the UE through the third interface; and
   performing admission control for the capability opening of the wireless network according to the admission policy.

10. A capability opening gateway, comprising:
    an acquiring unit, configured to acquire radio environment information of a user equipment (UE); and
    a processing unit, configured to:
       send the radio environment information to an application server, or
       perform admission control for capability opening of a wireless network according to the radio environment information;
    wherein the acquiring unit is further configured to:
       send an event list to a capability opening agent, wherein the event list is used to acquire the radio environment information, and the capability opening agent is on the UE;
       receive a triggered event in the event list, wherein the triggered event is sent by the capability opening agent through a third interface, and the capability opening agent exchanges the radio environment information with the capability opening gateway through the third interface; and
       determine the radio environment information according to the triggered event.

11. The capability opening gateway according to claim 10, wherein:
    the capability opening gateway further comprises:
       a generating unit, configured to generate an admission policy for the capability opening of the wireless network; and
    the processing unit is configured to perform the admission control according to the admission policy and the radio environment information.

12. The capability opening gateway according to claim 10, wherein:
    the capability opening gateway further comprises:
       a receiving unit, configured to receive fourth information sent by the application server, wherein the fourth information is used to request the capability opening of the wireless network, and the fourth information comprises required QoS of a service requested by the UE from the application server; and the processing unit is configured to perform the admission control according to the QoS and the radio environment information.

13. A capability opening agent, comprising:

an acquiring unit, configured to:
- acquire radio environment information of a user equipment (UE),
- receive an event list from a capability opening gateway for acquiring the radio environment information, and send a triggered event in the event list to the capability opening gateway through an interface, wherein the capability opening agent is configured to exchange the radio environment information with the capability opening gateway through the interface to enable the capability opening gateway to determine the radio environment information according to the triggered event; and a processing unit, configured to perform admission control for a capability opening of the wireless network according to the QoS and the radio environment information.

* * * * *